United States Patent [19]

Marchetti et al.

[11] 4,160,130

[45] Jul. 3, 1979

[54] ESSENTIAL USER BYPASS CIRCUIT FOR TELEPHONE SWITCHING SYSTEM

[75] Inventors: Charles R. Marchetti, Wellesley; Marvin S. Mason, Lexington, both of Mass.

[73] Assignee: GTE Sylvania Incorporated, Stamford, Conn.

[21] Appl. No.: 920,946

[22] Filed: Jun. 20, 1978

[51] Int. Cl.$^2$ .......................... H04M 3/42; H04Q 3/42
[52] U.S. Cl. .............................. 179/18 EA; 179/18 B
[58] Field of Search .................................... 179/18 BE

[56] References Cited

U.S. PATENT DOCUMENTS

| 3,573,389 | 4/1971 | Greenstein et al. | 179/18 BA |
| 3,702,905 | 11/1972 | Gil | 179/18 BA X |

Primary Examiner—William C. Cooper
Attorney, Agent, or Firm—Peter Xiarhos

[57] ABSTRACT

An essential user bypass circuit for use in switch units of a telephone switching system. Telephone subscribers at each switch unit are able to communicate with each other and with subscribers at other switch units via associated subscriber apparatus and trunk group lines interconnecting the switch units. All call processing operations, including the formation of "from-to" address signals for connecting subscribers with each other and with trunk group lines, are normally controlled by a processor unit (containing dual processors) at each switch unit. In the event of malfunction or failure of a processor unit or of certain other associated subscriber hardware, an essential user bypass circuit may be actuated in accordance with the invention, for example, by a manual switch, to bypass the malfunctioning or failed equipment to allow certain ones of the original subscribers, for example, ten percent of the original subscribers at the switch unit, to be connected with trunk group lines thereby to maintain communication with subscribers at other switch units. The connection of subscribers with trunk group lines is accomplished by the prestorage of a limited number of "from-to" address signals therein which are like those normally produced by the processor unit and which may be applied to the subscriber apparatus upon the malfunction or failure of equipment to cause the subscriber apparatus to establish the particular connections specified by the address signals.

7 Claims, 4 Drawing Figures

ESSENTIAL USER BYPASS CIRCUIT FOR TELEPHONE SWITCHING SYSTEM

The invention herein described was made in the course of a contract with the Department of the Army.

BACKGROUND OF THE INVENTION

The present invention relates to a telephone switching system and, more particularly, to a telephone switching system comprising a plurality of switch units each including a bypass unit for permitting a selected class or group of subscribers to make use of the system following certain malfunctions or failures within the system.

Telephone switching systems in which telephone subscribers are able to communicate with each other or with subscribers at one or more remote locations are well known to those skilled in the art. These systems commonly employ processors (e.g., computers) at each location for controlling or orchestrating all call processing operations by which subscribers may be connected to each other. These operations include such well known operations as the scanning of subscriber data lines to detect off-hook conditions, supplying dial tones, selecting available digital receivers for receiving dialed information, determining and selecting available trunk group lines, and, based on the identities of the various parties, formulating appropriate address information for connecting "calling" subscribers with "called" subscribers. The systems as described above generally include redundant processors so that if one processor should malfunction or fail and be required to be taken off line the other processor can be put on line to replace the malfunctioning or failed unit.

While the abovedescribed arrangement is generally satisfactory, there is ordinarily no provision for servicing subscribers, especially subscribers having a special and critical need to use the system (e.g., high-level military or government personnel), in the event both processors should malfunction or fail and be required to be taken off line. To this end, it has been proposed to use a patchboard arrangement for providing a limited or reduced number of connections between selected subscribers and trunk group lines, for example, up to ten percent of the normal connections, in the event both processors in a system should malfunction or fail and be taken off line. However, this patchboard approach has been determined to be undersirable since the patchboard arrangement would have to be of a substantial physical size to accommodate even a small group of subscribers (e.g., 60 subscribers) and could be incorporated into the system without interfering with the normal operation of the system only after the processors have been taken off line. This latter operation would be tedious and time consuming and lead to substantial downtime of the system.

BRIEF SUMMARY OF THE INVENTION

A switch unit is provided in accordance with the invention for a telephone system which avoids the problems and disadvantages of prior arrangements as briefly discussed hereinabove. The switch unit is employed within the telephone system for establishing connections between telephone subscribers assigned to the switch unit and subscribers assigned to other switch units. The switch unit is adapted to be interconnected with other switch units by trunk lines.

The switch unit in accordance with the invention includes subscriber subsets for initiating call operations and subscriber apparatus means coupled to the subscriber subsets and to trunk lines to other switch units. The subscriber apparatus means has an address input for receiving address signals relating to call processing operations initiated by subscribers assigned to the switch unit and operates in response to address signals received at its address input to establish connections between subscribers assigned to the switch unit or between subscribers assigned to the switch unit and trunk lines to other switch units.

The switch unit further includes an essential user bypass means coupled to the address input of the subscriber apparatus means. The essential user bypass means is adapted in accordance with the invention to store a predetermined number of address signals specifying connections between preselected ones but less than all of the subscribers assigned to the switch unit and trunk lines to other switch units. The essential user bypass means is adapted to be enabled in accordance with the invention to supply the address signals stored therein to the address input of the subscriber apparatus means in place of address signals applied to the address input prior to the enablement of the essential user bypass means. The subscriber apparatus means operates in response to address signals received at its address input from the essential user bypass means to establish connections between the preselected ones of the subscribers assigned to the switch unit and trunk lines to other switch units as specified by the address signals.

BRIEF DESCRIPTION OF THE INVENTION

Various objects, features and advantages of a telephone switching system in accordance with the invention will be apparent from the following description taken in conjunction with the accompanying drawing in which.

DETAILED DESCRIPTION OF THE INVENTION

Figure 1:
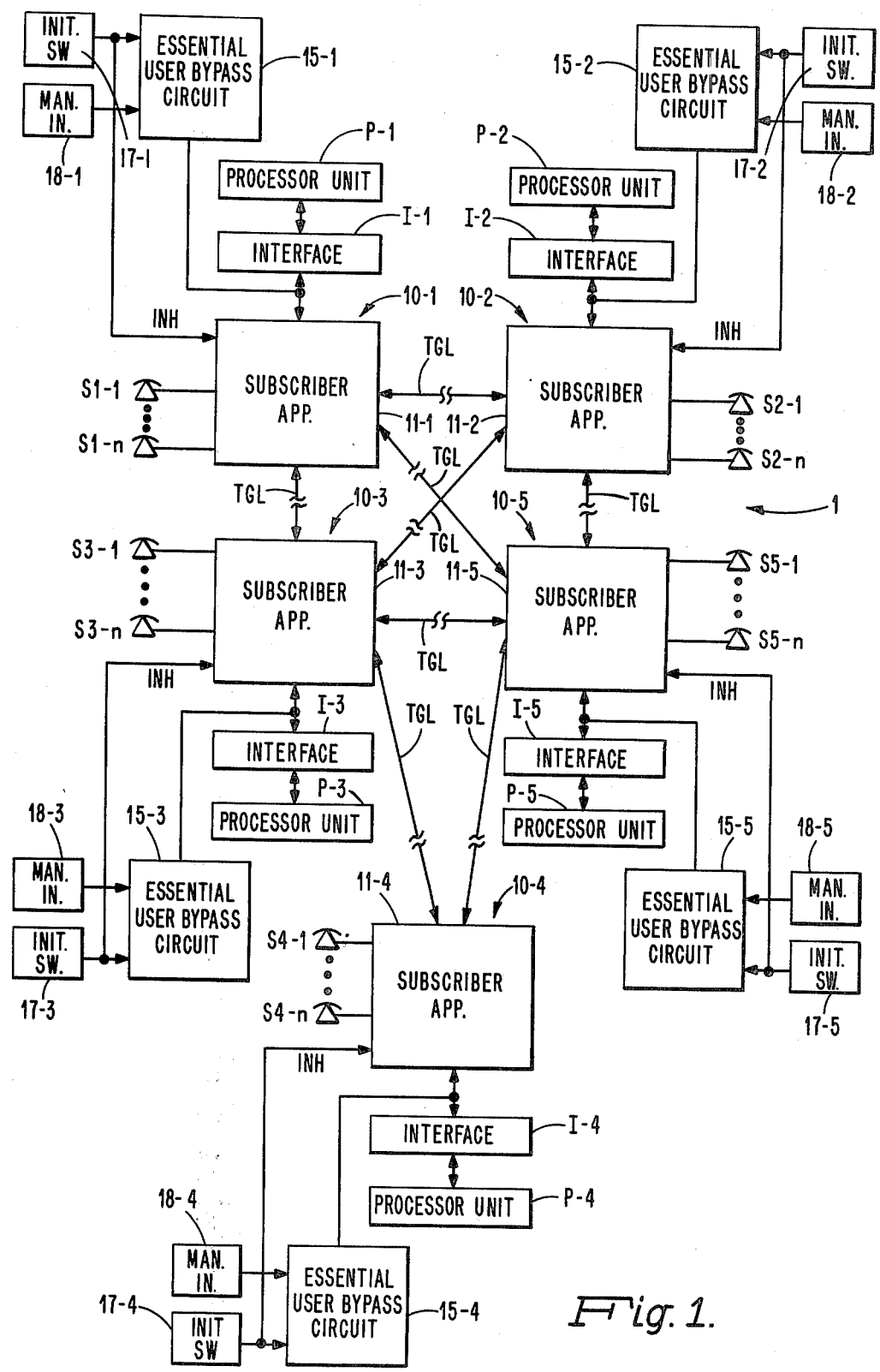
FIG. 1 is a block diagram of a telephone switching system including a plurality of individual processor-controlled switch units each including an essential user bypass circuit in accordance with the invention for permitting selected subscribers to be connected with other subscribers even following the malfunctioning or failure of certain components of the system.

Referring now to FIG. 1, there is shown a telephone system 1 including a plurality of switch units 10 in accordance with the invention. Each of the switch units 10 includes subscriber apparatus 11 to which digital subsets of a plurality of subscribers S are coupled for enabling these subscribers to talk with each other or, via trunk group lines TGL interconnecting the various switch units 10, with subscribers at other ones of the switch units 10. The switch units 10 may be variously distributed over a given, generally-wide, geographical area with the subscribers associated with each switch unit 10 typically operating within a small geographical area, for example, within a radius of about one-half mile.

Under normal operating conditions, a subscriber at one of the switch units 10 is able to communicate directly or indirectly with a subscriber at another switch unit 10. Thus, for example, if a subscriber at the switch unit 10-1 wishes to talk with a subscriber at the switch unit 10-2 and the trunk group lines TGL between the switch units 10-1 and 10-2 are busy, the calling subscriber at the switch unit 10-1 may nonetheless be connected with the desired subscriber at the switch unit 10-2 via the switch unit 10-5 if the trunk group lines TGL interconnecting the switch units 10-1 and 10-5 and the switch units 10-5 and 10-2 are not busy.

All calls originating with or received by a switch unit 10 are processed within the associated subscriber apparatus 11 under the control of an associated processor unit P. Each of the processor units P typically includes a first, on-line, processor which normally handles all call processing of the associated subscriber apparatus 11, and a second, off-line, standby processor. The standby processor simultaneously performs call processing operations in parallel with the first processor and is arranged to be placed in an on-line status, to thereupon handle call processing for the subscriber apparatus 11, only when the first processor has been placed in an off-line status. As is well known, by the use of dual processing one processor may be quickly and automatically substituted for the other processor, without noticeable interruption of service, should the processor be required for any reason to be placed in an off-line status.

Each processor, when in an on-line status, operates to control such standard well-known operations within the associated subscriber apparatus 11 as scanning subscriber data lines to detect off-hook conditions, supplying dial tones, selecting available digital receivers for receiving dialed information, determining and selecting available trunk group lines and, based on the identities of the various parties, formulating appropriate "from-to" addresses and other required information for connecting calling subscribers with local subscribers or, via trunk group lines, with remote subscribers. Normally, it is expected that one or the other of the dual processors associated with each of the switch units 10 will be in an on-line status and, accordingly, control the types of call processing operations as described hereinabove. However, there may be times where, for one reason or another, for example, malfunctioning or failure of the processors, both processors are required to be placed in an off-line status. Unless provisions are made for dealing with this possibility, all of the subscribers tied directly into the affected subscriber apparatus 11 will be left entirely without service. In some situations, for example, in military or other high-level, high-priority governmental organizations, it may be absolutely essential that certain key, high-level, individuals be able to communicate at all times with other individuals, especially those not at the same geographical location, even following the failure or malfunctioning of both processors of a processor unit P. This maintenance of service, even on a limited basis, may be similarly desired for certain types of failures or malfunctioning of processor interface units I, to be discussed hereinafter, interconnecting the processor units P with the subscriber apparatus 11.

In accordance with the present invention, each of the switch units 10 is provided with an essential user bypass circuit 15 by which service may be established and maintained for a select group of subscribers or users at each switch unit 10 even after malfunctioning or failure of both processors of a processor unit P or malfunctioning or failure of an interface unit I. As will be discussed in greater detail hereinafter, each of the essential user bypass circuits 15 has a plurality of "from-to" address signals prestored therein by which a small percentage, for example, ten percent, of the usual number of subscribers may be connected via trunk group lines with subscribers at other switch units following the malfunctioning or failure or a processor unit P or an interface unit I. By way of example, if the subscriber apparatus 11 of a switch unit 10 normally processes "from-to" connections for 600 subscribers, the essential user bypass circuit 15 for that switch unit allows "from-to" connections to be established for only ten percent, or 60, of these original subscribers. These 60 subscribers may represent, for example, certain key, high-level, subscribers. The "from-to" address signals stored within an essential user bypass circuit 15 are established so that the selected subscribers at the associated switch unit 10 cannot be connected with non-selected subscribers at the same switch unit since presumably the selected and non-selected subscribers, by virtue of all being located within a small geographical area (e.g., one-half mile), are able otherwise to communicate with each other than through the system (e.g., in person, through messengers or by wireless paging apparatus). The selected subscribers at the switch unit are able however to communicate with each other, for example, by employing another switch unit and a dedicated trunk group line between the switch units.

The operation of an essential user bypass circuit 15 by which the associated subscriber apparatus 11 is enabled to establish the reduced number of "from-to" connections between selected subscribers is initiated by means of an initiate switch 17 connected to the bypass circuit. This switch 17 is normally placed into operation by an individual upon a determination by that individual that a processor unit P or an interface unit I is malfunctioning or has failed to such a degree that normal call processing is not possible or has been severely and seriously impaired. As will be discussed more fully hereinafter, operation of the initiate switch 17 causes the associated subscriber apparatus 11 to be inhibited or electrically disconnected from the processor unit P and the prestored "from-to" address signals in the associated bypass unit 15 to be loaded in succession into the subscriber apparatus 11 whereupon the limited number of connections between subscribers and trunk group lines are sequentially effected. If desired, any one of these address signals may be replaced at any time and for any reason, for example, to effect a subscriber or trunk group line change, by a manual input unit 18 which operates to manually establish a new "from-to" address signal to replace an existing address signal. This new address signal may then be entered into the subscriber apparatus 11.

Figure 2:
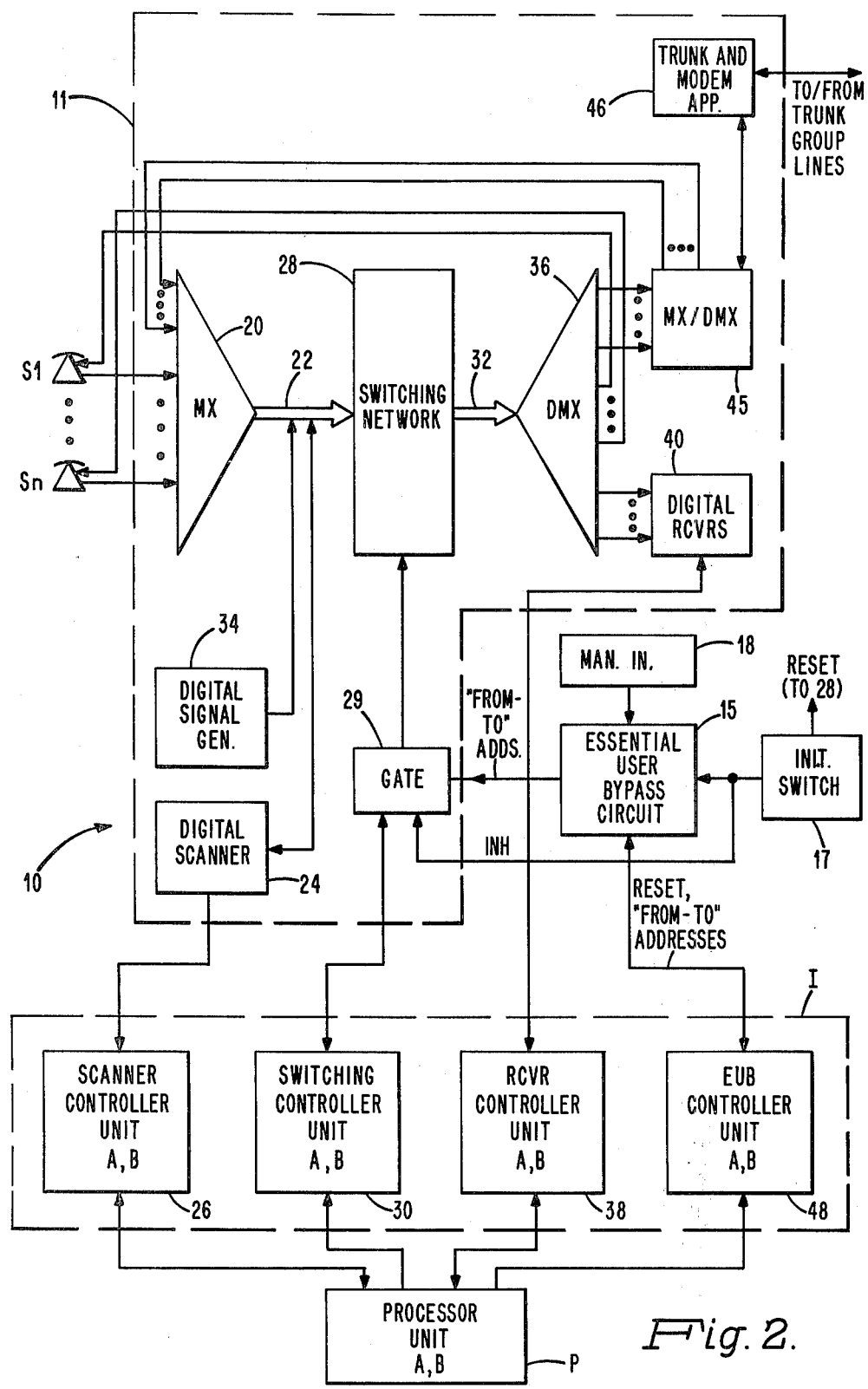
FIG. 2 is a detailed block diagram of one of the switch units of FIG. 1.

A switch unit 10 such as generally shown in FIG. 1 is shown in greater detail in FIG. 2. As indicated in FIG. 2, the digital subsets of a plurality of subscribers S are coupled to a multiplex arrangement 20 provided in the subscriber apparatus 11. The multiplex arrangement 20 operates to time division multiplex all data, including off-hook data and dialed digital data, originating with the subsets and to present this data in a serial multiplexed format on output lines 22. In a normal call processing operation, the off-hook status of a subscriber subset is detected by a digital scanner 24 which continuously scans the serial multiplexed output data from the multiplexer arrangement 20 to detect the off-hook condition (e.g., a special code) and to provide a signal identifying the off-hook subscriber to the processor unit P via a scanner controller unit 26 provided within the interface unit I. The scanner controller unit 26 serves to process the data from the digital scanner 24 in a format usable by the processor unit P. Both the scanner controller unit 26 and the processor unit P, as well as other controller units provided within the interface unit I as shown in FIG. 2, contain redundant apparatus A, B for permitting one apparatus to automatically replace the other apparatus should such other apparatus be placed in an off line status for any reason (e.g., malfunction or failure).

Once the processor unit P has been informed of the identity of an off-hook subscriber as described above, the processor unit P operates, via a switching controller unit 30 provided in the interface unit I, to enable a switching network 28 via a gate 29 to establish a path through the switching network 28 to one of a plurality of output lines 32 by which data may be supplied to the off-hook subscriber. A dial tone, for example, in the form of a multiplexed presynthesized digital tone signal, is supplied to this path by a digital signal generator 34 and demultiplexed by a demultiplexer arrangement 36 and converted within the subscriber subset (or at a local switchboard, not shown) to audible signals. At the same time, the processor unit P operates, via a receiver controller unit 38 provided within the interface unit I, to select one of a plurality of digital receivers 40 coupled to the demultiplexer arrangement 36 to receive dialed digital data initiated by the subscriber following receipt by the subscriber of the dial tone. The dialed data, when initiated by the subscriber, is in a series bit format, for example, at a typical bit rate of 32 Khz, and is multiplexed by the multiplexer arrangement 20, for example, at a typical bit rate of 2.048 Mhz, and presented in common to the output lines 22 of the multiplexer arrangement 20. This multiplexed data passes via the preestablished path through the switching network 28 to the demultiplexer arrangement 36 and, following demultiplexing by the demultiplexer arrangement 36, to the selected digital receiver 40.

Once the processor unit P ascertains the identity of the called subscriber, specifically, from the dialed data initiated by the calling subscriber, the processor unit P is able to use this information, together with the previously ascertained identity of the calling subscriber, to connect the calling subscriber with the called subscriber. To achieve this result, the processor unit P formulates a "from-to" address signal for interconnecting the calling and called subscribers. This signal is applied via the switching controller unit 30 to the switching network 28. This address signal takes the form shown in FIG. 3 and includes a first segment of 15 bits designating one address labeled the A address (identifying the calling subscriber), a second segment of 15 bits designating another address labeled the B address (identifying a local called subscriber or a trunk group line), and eight final bits indicating an operation command. The first five bits of the first segment labeled bit select A designates one of the output lines 22 of the multiplexer arrangement 20 or one of the output lines 32 of the switching network 28. The next six bits labeled address A designate a particular one of a plurality of time division channels or time slots of the output lines 22 and 32, for example, one of 64 channels or slots for each line (corresponding to a like number of subscribers). The next four bits labeled parity A are parity checks bits used in checking the address A information. The address B information segment similarly contains bit select B, address B, and parity B portions. The command bits, the last eight in the address instruction, cause the switching network 28 to perform certain specific operations. These include a full connect operation in which the output line 22 and channel designated by the A address is connected to the output line 32 and channel designated by the B address and the output line 22 and channel designated by the B address is connected to the output line 32 and channel designated by the A address. If the command calls for a half connect operation, the output line 22 and channel designated by the A address is connected to the output line 32 and channel designated by the B address.

If a subscriber at the switch unit 10 as shown in FIG. 2 is to be connected with a subscriber at another switch unit, the transmission of data between the subscribers is accomplished by a multiplex/demultiplex apparatus 45 connected to the multiplexer arrangement 20, to the demultiplexer arrangement 36, and to trunk and modem apparatus 46. Digital data originating with the calling subscriber and appearing in a demultiplexed format at the output of the demultiplexer arrangement 36 is multiplexed by the multiplex/demultiplex apparatus 45 and applied to the trunk and modem apparatus 46 for application to a trunk group line. Digital data received over a trunk group line from the called subscriber and received in a multiplexed format by the trunk and modem apparatus 46 is demultiplexed by the multiplex/demultiplex apparatus 45 and applied to inputs of the multiplexer arrangement 20. The demultiplexed data is then multiplexed by the multiplexer arrangement 20 and applied to the switching network 28. The switching network 28 operates, in the manner earlier described to pass the multiplexed data therethrough to the demultiplexer arrangement 36 wherein the data is demultiplexed and applied to the subset of the calling subscriber.

The aforementioned multiplexer arrangement 20, switching network 28, and demultiplexer arrangement 36, although only briefly described hereinabove to set forth the background or environment in which an essential user bypass user circuit 15 is intended to be used in accordance with the present invention, are described in much greater detail in U.S. Pat. No. 3,959,596, in the names of Robert J. Bojanek, Robert G. Field, and Marvin S. Mason, and entitled TIME DIVISION SWITCHING NETWORK. A suitable implementation of the multiplex/demultiplex apparatus 45 and its manner of cooperation with the trunk and modem apparatus 46 is described in detail in a copending application of Robert J. Bojanek and Marvin S. Mason, Ser. No. 901,928, filed May 1, 1978, and entitled MODULAR MULTIPLEX/DEMULTIPLEX APPARATUS. A suitable implementation of the digital signal generator 34 is described in U.S. Pat. No. 3,985,965, in the names of Robert G. Field and Marvin S. Mason, and entitled DIGITAL SIGNAL GENERATOR. A suitable implementation of the digital receivers 40 is described in U.S. Pat. No. 3,919,690, in the names of Robert G. Field and Donn A. Wahl, and entitled DIGITAL RECEIVING APPARATUS or, alternatively, in U.S. Pat. No. 3,973,242, also in the names of Robert G. Field and Donn A. Wahl, and entitled DIGITAL RECEIVER. The aforementioned patents and co-pending application are all assigned to the same assignee as the present application.

As mentioned previously, in the event that certain apparatus of the switch unit 10, such as the processor unit P and/or the interface unit I, should malfunction or fail and be required for any reason to be placed in an off-line status whereby normal cell processing is no longer possible or severely impaired, it is desirable that at least some of the original subscribers at the switch unit, for example, ten percent of these subscribers, be able to continue to use the system in the usual manner. This comtinuance of service is achieved in accordance with the present invention by an essential user bypass circuit 15 which may be placed into operation, for example, by an individual in charge of the switch unit, at such time as the processor unit P and/or the interface unit I are placed in an off-line status. As will be discussed more fully hereinafter in connection with FIG. 4, the essential user bypass circuit 15 is adapted in accordance with the present invention to prestore a fixed number of "from-to" address signals, for example, up to sixty such address signals, for allowing up to 60 subscribers at the associated switch unit 10 to continue to use the system in the usual fashion following the placement of the processor unit P and/or interface unit I in an off-line status. Each of the address signals, together with appropriate operation command data, takes the same form as the previously described address signals normally generated by the processor unit P and shown in FIG. 3. The subscriber apparatus 11 is accordingly unable to ascertain the particular source of the address signals, that is, whether they originate with the processor unit P or the essential user bypass circuit 15.

At such time as it is desired to place the bypass circuit 15 into operation, an initiate switch 17 is manually operated as a result of which the switching network 28 is cleared or reset, the gate 29 is inhibited or disconnected from the interface unit I and the processor unit P, and the prestored "from-to" address signals, together with appropriate operation command data, are applied via the gate 29 in succession to the switching network 28. The switching network 28 operates in response to the "from-to" address signals to make permanent connections or paths therethrough in succession for interconnecting the select group of subscribers at the switch unit 10 with corresponding ones of the trunk group lines TGL. It is to be noted, and as previously mentioned, that the "from-to" address signals are selected so that the selected subscribers at the switch unit 10 cannot be connected with local, non-selected subscribers at the same switch unit since presumably these subscribers, by virtue of all being located within a small geographical area (e.g., one-half mile), are able otherwise to communicate with each other than through the system, for example, in person, through messengers, or by wireless paging apparatus.

If after the address signals have been prestored in the bypass unit 15 to prepare the bypass unit 15 for future use as mentioned above, it is desired for any reason or at any time to replace any of the address signals with another address signal, for example, representing a change in subscribers or a change in a trunk group line, this change can be easily effected by means of a manual control unit 18. As will be discussed more fully in connection with FIG. 4, this manual control unit 18, which may take the form of a simple multi-position thumbwheel switch, operates to manually alter an existing prestored address signal in the bypass unit 15 to create a new address signal which is then applied by the bypass unit 15 together with the appropriate operation command data to the switching network 28 of the subscriber apparatus 11.

Figure 3:
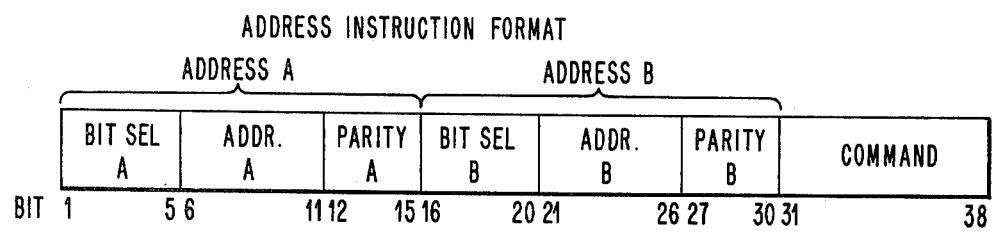
FIG. 3 illustrates the format of an address signal employed by the switch units of FIG. 1.

The prestoring of address signals within the essential user bypass circuit 15 as discussed above is achieved in a straightforward manner by the processor unit P and by an EUB controller unit 48 provided within the interface unit I. Once it has been determined which subscribers are to be allowed to use the system following the placement of the processor unit P and/or interface unit I in an off-line status, the appropriate "from-to" address signals are assembled within the processor unit P. Each of these address signals at this point has the same form as shown in FIG. 3 but lacking the command bits (last eight bits). The bypass circuit 15 is then reset via the controller unit 48, to prepare the circuit 15 to receive the address signals, and the address signals as assembled within the processor unit P are then clocked into and stored in succession in the bypass unit 15.

Figure 4:
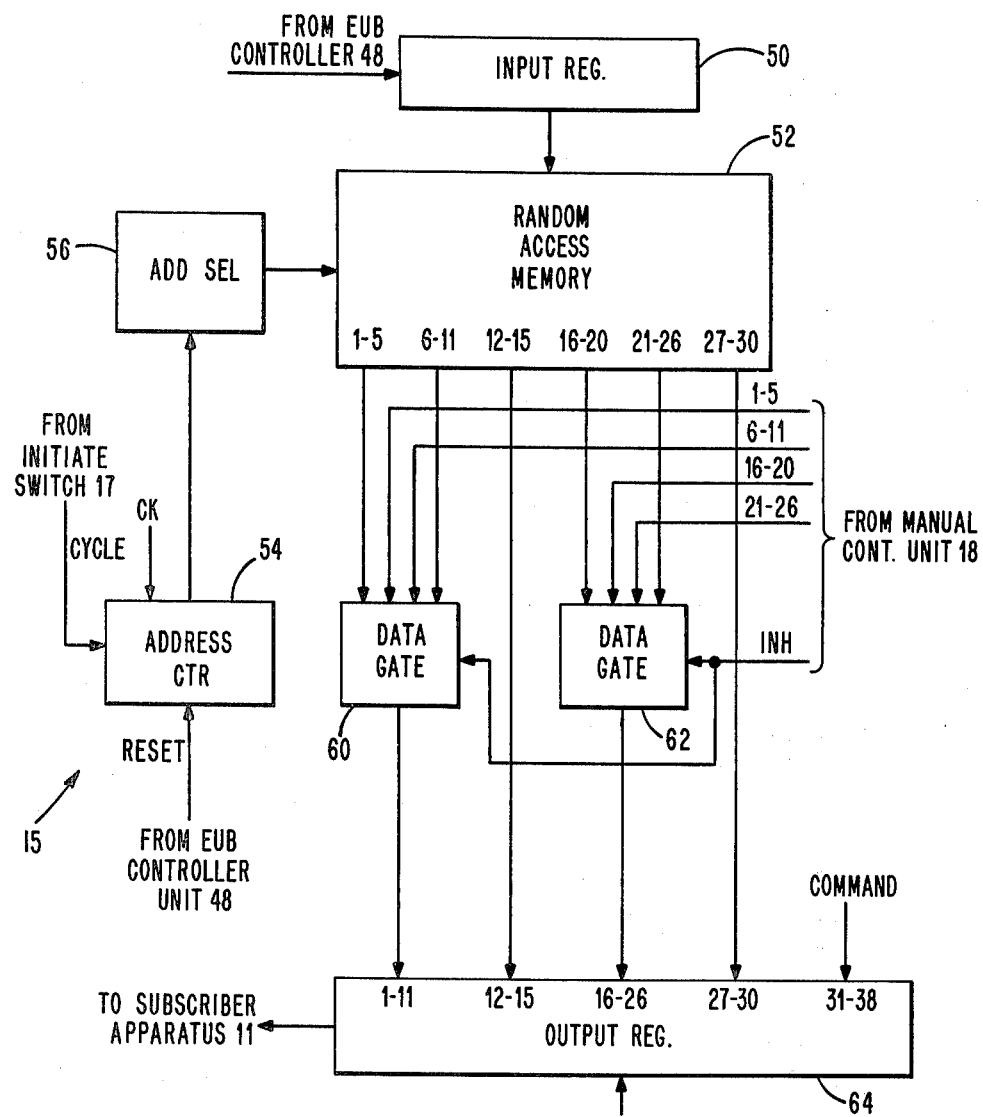
FIG. 4 is a detailed block diagram of an essential user bypass unit provided in each of the plurality of switch units of FIG. 1.

Referring now to FIG. 4, there is shown a block diagram of an essential user bypass circuit 15 in accordance with the invention. The essential user bypass circuit 15 includes an input register 50 adapted to receive in succession the various address signals of 30 bits each as received from the processor unit P via the EUB controller unit 48. Each of these address signals is caused to be read into and stored in a random access memory 52. The memory 52 has a capacity for storing up to 60 address signals of 30 bits each. The storing of address signals in the memory 52 is controlled by an address counter 54 and an address selector 56. The address counter 54 is initially reset to zero by a reset signal initiated by the processor unit P (via the controller unit 48) to prepare the bypass circuit 15 to receive 30-bit address signals as assembled by the processor unit P. After being reset, the address counter 54 is clocked by successive clock signals to cause the address selector 54 to select successive addresses in the memory 52 for storing the address signals read out in succession from the input register 50.

Once all of the address signals from the processor unit P have been read into and stored in the memory 52, the address signals may be read out therefrom for application to the associated subscriber apparatus 11 in response to actuation of the initiate switch 17. The actuation of this switch causes the address counter 54 to cycle through its counts as a result of which the address selector 56 causes the memory 52 to read out the various 30-bit address signals stored therein at its successive storage locations. The "from-to" address bits 1–11 and 16–26 of each 30-bit address signal are applied to data gates 60 and 62 and, in the absence of any changes to be made in the address signal by the manual control unit 18, are allowed to pass through the gates 60 and 62 to an output register 64. The remaining bits of each address signal are applied directly to the output register 64 and stored in the output register 64 together with the aforementioned bits 1–11 and 16–26. An additional eight bits, bits 31–38, representing command operation bits (e.g., full-connect or half-connect operations), are added to the 30 bits stored in the output register 64 to form a 38-bit address signal such as shown in FIG. 3 for application (via the gate 29) to the subscriber apparatus 11. The eight command bits may be inserted into the output register 64 by a multi-position thumbwheel switch. As each 38-bit address signal is stored in the output register 64 it may then be clocked out therefrom and applied to the subscriber apparatus 11 for utilization thereby as previously described.

If at any time it is desired to change any one of the 30-bit address signals stored in the memory 52, it is only necessary to change the "from-to" address bits 1–11 and 16–26 of the address signal by means of the manual control unit 18. The operation of the manual control unit 18 serves to inhibit readout of data from the memory 52, by means of an inhibit signal applied to the gates 60 and 62 from the unit 18, and to instead allow passage through the gates 60 and 62 of "from-to" address bits as manually entered by the manual control unit 18.

While there has been described what is considered to be a preferred embodiment of the invention it will be obvious to those skilled in the art that various changes and modifications may be made therein without departing from the invention as called for in the appended claims.

What is claimed is:

1. A switch unit for a telephone system for establishing connections between telephone subscribers assigned to the switch unit and subscribers assigned to other switch units, said switch unit being adapted to be interconnected with other switch units by trunk lines, said switch unit comprising:
    subscriber subsets for initiating call operations;
    subscriber apparatus means coupled to the subscriber subsets and to trunk lines to other switch units, said subscriber apparatus means having an address input for receiving address signals relating to call processing operations initiated by subscribers assigned to the switch unit, said subscriber apparatus means being operative in response to address signals received at its address input to establish connections between subscribers assigned to the switch unit or between subscribers assigned to the switch unit and trunk lines to other switch units; and
    essential user bypass means coupled to the address input of the subscriber apparatus means and adapted to store a predetermined number of address signals specifying connections between preselected ones but less than all of the subscribers assigned to the switch unit and trunk lines to other switch units, each of said address signals including a first address portion identifying a particular one of the preselected subscribers and a second address portion identifying a particular trunk line, said essential user bypass means being adapted to be enabled to supply the address signals stored therein to the address input of the subscriber apparatus means in place of address signals applied to the address input prior to the enablement of the essential user bypass means; and
    said subscriber apparatus means being operative in response to address signals received at its address input from the essential user bypass means to establish connections between the preselected ones of the subscribers assigned to the switch unit and trunk lines to other switch units as specified by the address signals.

2. A switch unit in accordance with claim 1 wherein the essential user bypass means includes:
    storage means coupled to the address input of the subscriber apparatus means and having a plurality of storage locations adapted to store a predetermined number of address signals;
    input means coupled to the storage means and adapted to receive in succession the predetermined number of address signals to be stored in the storage means; and
    address circuit means adapted to receive a control signal and operative in response to said control signal to cause each address signal received by the input means to be entered into and stored in a storage location in the storage means.

3. A switch unit in accordance with claim 2 further comprising:
    initiate switch means coupled to the address circuit means of the essential user bypass means and capable of being actuated manually to initiate operation of the essential user bypass means to cause address signals stored in the storage means to be applied to the address input of the subscriber apparatus means;
    said address circuit means being operative in response to manual actuation of the initiate switch means to cause the address signals stored in the storage means to be read out in succession from the storage locations thereof and to be applied in succession to the address input of the subscriber apparatus means.

4. A switch unit in accordance with claim 3 wherein:
    each address signal stored in the storage means of the essential user bypass means is selected to permit connections to be established only between subscribers assigned to the switch unit and trunk lines and not between the subscribers assigned to the switch unit.

5. A switch unit in accordance with claim 3 wherein:
    the storage means is adapted to store address signals therein specifying connections for up to ten percent of the subscribers assigned to the switch unit.

6. A switch unit in accordance with claim 3 further comprising:
    manual address entry means coupled to the storage means and operative to substitute a manually entered address signal for an existing address signal stored in the storage means.

7. A switch unit in accordance with claim 6 wherein:
    the storage means is adapted to store address signals therein specifying connections for up to ten percent of the subscribers assigned to the switch unit, each address signal stored in the storage means being selected to permit connections to be established only between subscribers assigned to the switch unit and trunk lines and not between the subscribers assigned to the switch unit.

* * * * *